Nov. 21, 1961 C. SCHRAMM 3,009,180
BOOK CASING-IN MACHINE AND ADHESIVE APPLYING ATTACHMENT THEREFOR
Filed Oct. 4, 1956 7 Sheets-Sheet 1

FIG.1

INVENTOR
CARL SCHRAMM
BY Teller & McCormick
ATTORNEYS

Nov. 21, 1961  C. SCHRAMM  3,009,180
BOOK CASING--IN MACHINE AND ADHESIVE APPLYING ATTACHMENT THEREFOR
Filed Oct. 4, 1956  7 Sheets-Sheet 3

FIG. 5

INVENTOR
CARL SCHRAMM
BY Teller & McCormick
ATTORNEYS

Nov. 21, 1961 C. SCHRAMM 3,009,180
BOOK CASING-IN MACHINE AND ADHESIVE APPLYING ATTACHMENT THEREFOR
Filed Oct. 4, 1956 7 Sheets-Sheet 4

FIG. 6

INVENTOR
CARL SCHRAMM
BY Teller & McCormick
ATTORNEYS

FIG. 8

INVENTOR
CARL SCHRAMM

Nov. 21, 1961     C. SCHRAMM     3,009,180
BOOK CASING--IN MACHINE AND ADHESIVE APPLYING ATTACHMENT THEREFOR
Filed Oct. 4, 1956     7 Sheets-Sheet 7

INVENTOR
CARL SCHRAMM
BY Teller & McCormick
ATTORNEYS

United States Patent Office 3,009,180
Patented Nov. 21, 1961

3,009,180
BOOK CASING-IN MACHINE AND ADHESIVE
APPLYING ATTACHMENT THEREFOR
Carl Schramm, North Coventry, Conn., assignor to The
Smyth Manufacturing Company, Hartford, Conn., a
corporation of Connecticut
Filed Oct. 4, 1956, Ser. No. 613,861
8 Claims. (Cl. 11—3)

The invention, while not necessarily so limited, relates particularly to a book casing-in machine of the type disclosed in the Schramm and Clark Patent No. 1,765,349, dated July 17, 1930, and entitled "Casing-in Machine."

The machine as disclosed in said patent includes means for feeding a succession of book fillers horizontally and then upwardly and includes means for applying paste to the entire sides of the fillers as they are moved upwardly. The said means for applying paste comprises two horizontal paste rolls that are moved transversely into filler engaging positions in proper synchronism with upward filler movement. As upward movement of the fillers is continued beyond the pasting position, the fillers are engaged with casings and the covers of the casings are folded downwardly so as to adhere to said fillers at the pasted sides thereof.

The fillers are rounded prior to the casing-in operation and the rounded backs of said fillers are somewhat wider than the main bodies thereof. With transversely movable horizontal paste rolls, difficulty is frequently experienced in so timing the paste roll movements that said rolls properly engage the fillers in such manner as to adequately paste the upper inwardly curved zones immediately below the wider rounded backs.

It has furthermore been found for some types of books that paste, even when adequately applied, does not provide sufficient bonding strength between the filler and the casing in the areas that are immediately adjacent the joints of the casing between the back thereof and the covers thereof.

It has heretofore been proposed and practiced to provide a casing-in machine having means additional to the main pasting means for applying an adhesive, which may be glue, to the said upper inwardly curved zones adjacent the backs of the fillers, the last said additional or auxiliary adhesive applying means being operable during the initial horizontal movement of the fillers and before they reach said main pasting means. Said auxiliary means have comprised two opposite adhesive applying rolls that were rotatable about axes in a plane perpendicular to lengthwise direction of the said upper zones so that said rolls have rolling engagement with the fillers at said upper zones. As heretofore proposed and practiced means have been provided for moving the auxiliary adhesive applying rolls toward and away from each other to bring them into and out of positions for engaging the fillers.

The general object of the present invention is to provide a machine, or an attachment for an existing machine, having improved means for effecting the movements of the adhesive applying rolls toward and away from each other in synchronism with the horizontal movements of the fillers.

The drawings show in detail a preferred embodiment of the invention, but it will be understood that various changes may be made from the construction shown, and that the drawings are not to be construed as defining or limiting the scope of the invention, the claims forming a part of this specification being relied upon for that purpose.

Figure 1:
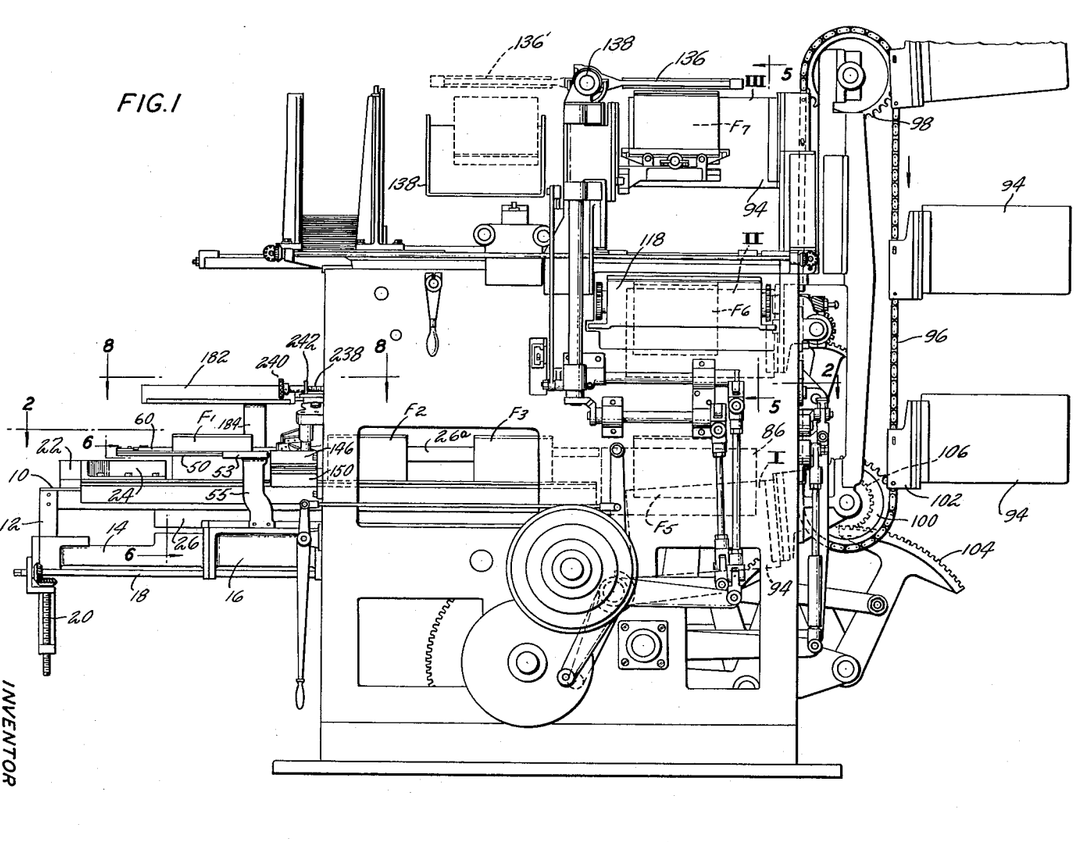
FIG. 1 is a side view of a machine embodying the invention.
Figures 2, 3, 4:
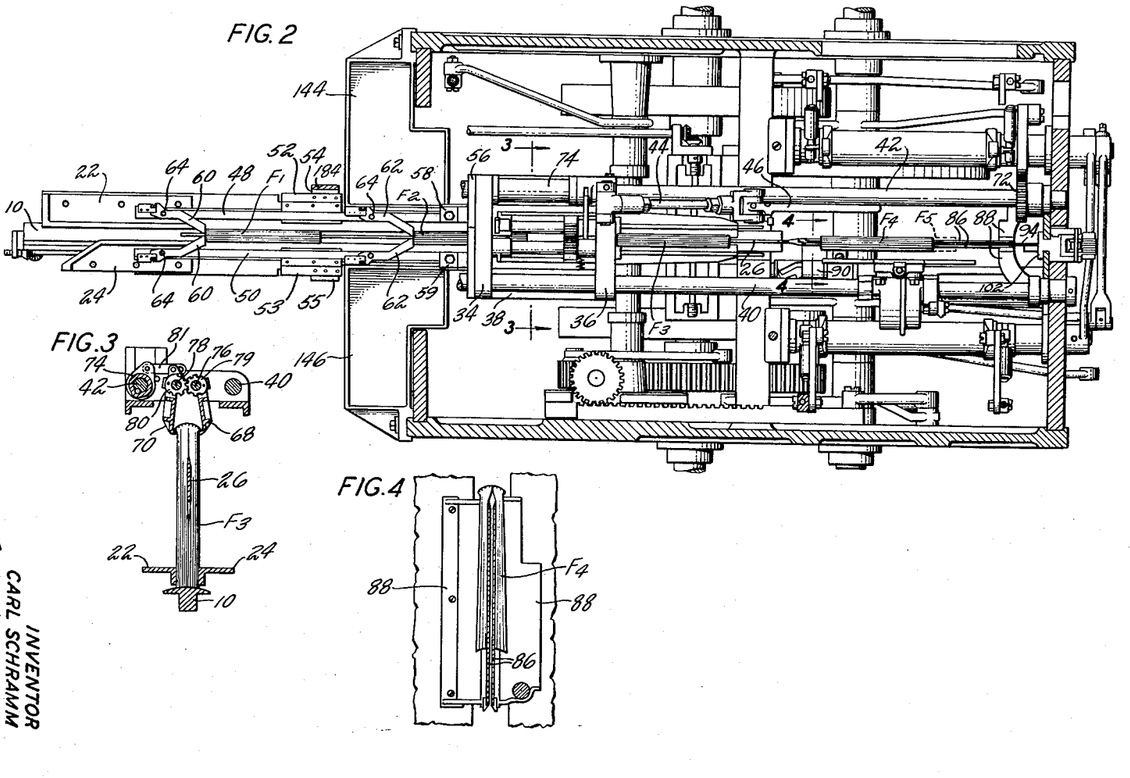
FIG. 2 is a fragmentary horizontal sectional view taken along the line 2—2 of FIG. 1, the right portion of the machine being omitted.
FIG. 3 is a fragmentary transverse sectional view taken along the line 3—3 of FIG. 2.
FIG. 4 is a fragmentary transverse sectional view taken along the line 4—4 of FIG. 2, but with various background parts omitted.

The major portions of the machine, as shown in FIGS. 1, 2 and 3, have been previously known, but the machine includes an additional adhesive applying means which may be incorporated in an attachment, and there are certain other changes as hereinafter pointed out. Said major portions of the machine are shown in said Patent No. 1,765,349. The known portions of the machine will first be described in general terms with incidental reference to the added attachment or adhesive applying means. Thereafter the said added attachment or adhesive applying means will be described in detail.

In the description that immediately follows reference will be had particularly to FIGS. 1 to 5. The machine comprises a main framework which carries a horizontal longitudinal guide bar 10 for the book fillers F, F. The fillers are placed on the guide bar manually or otherwise with their backs uppermost and they are moved through the machine from front to rear or from left to right, as viewed in FIGS. 1 and 2. The fillers have been previously shaped or rounded and the shape of the upper face of the supporting bar 10 is such that it conforms with the rounding of the filler and therefore serves to maintain said rounding.

The bar 10 is supported at its front or left end by a post 12 carried by a bracket 14 which in turn is carried by a bracket 16 secured to and projecting from the main frame of the machine. The post 12 is vertically adjustable relatively to the bracket 14. Said bar 10 is similarly supported at its rear or right end portion by one or more posts similar to the post 12 but not shown. A rotatable longitudinal shaft 18 is provided which is connected by bevel gears with a screw 20 and is similarly connected with one or more similar screws that are not shown. By rotating the shaft 18 and the vertical screws such as 20, the bar 10 can be raised or lowered in parallelism according to the widths of the book fillers F, F.

At opposite sides of the supporting bar 10 are vertical longitudinal guides 22 and 24 for the book fillers. These guides are supported by the post 12 and also at positions within the framework and they are vertically adjustable in unison with said bar. Said guides are preferably adjustable transversely toward and from each other to accommodate books of different thickness. The mechanism for transversely adjusting the guides is not shown. As the fillers move longitudinally along the guide bar 10, they are supported at their sides by said guides 22 and 24. The filler supporting bar 10 has central longitudinal slots near the front and rear which receive downwardly extending portions of a relatively thin stationary longitudinal book guide plate 26. The central portion of said guide is relatively narrow as shown at 26ª in FIG. 1 and in the right portion of FIG. 7. The downwardly extending front portion of said plate is held near the bottom thereof between two supporting plates 28 and 29, said supporting plates being rigidly secured to said bracket 16. The downwardly extending rear portion of the guide plate 26 is rigidly supported by means not shown. The plate 26 preferably has an upwardly and rearwardly inclined front edge 30. Said edge 30 of said plate and also the top edge 32 thereof have oppositely beveled faces. In the operation of the machine, the fillers are placed on the bar 10 and between the guides 22 and 24 and the leaves of each of them are separated at or near the center to the inclined front edge of said guide plate 26. The supporting bar 10 is vertically adjustable as previously stated and is adjusted to such an extent that the backs of the fillers are always at a predetermined level and are therefore always in a predetermined relationship to the guide plate 26.

Within the framework of the machine is a longitudinal reciprocating carrier unit for effecting intermittent feeding of the fillers F, F. This unit comprises two cross bars 34 and 36 connected by the bars 38, 38. The cross bars and the parts carried thereby are supported by and are movable along a stationary shaft 40 and an oscillatory shaft 42. The cross bar 36 is connected by a link 44 with the upper arm of a lever 46 that is pivotally movable by a suitable cam so that it has one oscillation during each cycle of the machine.

Figure 7:
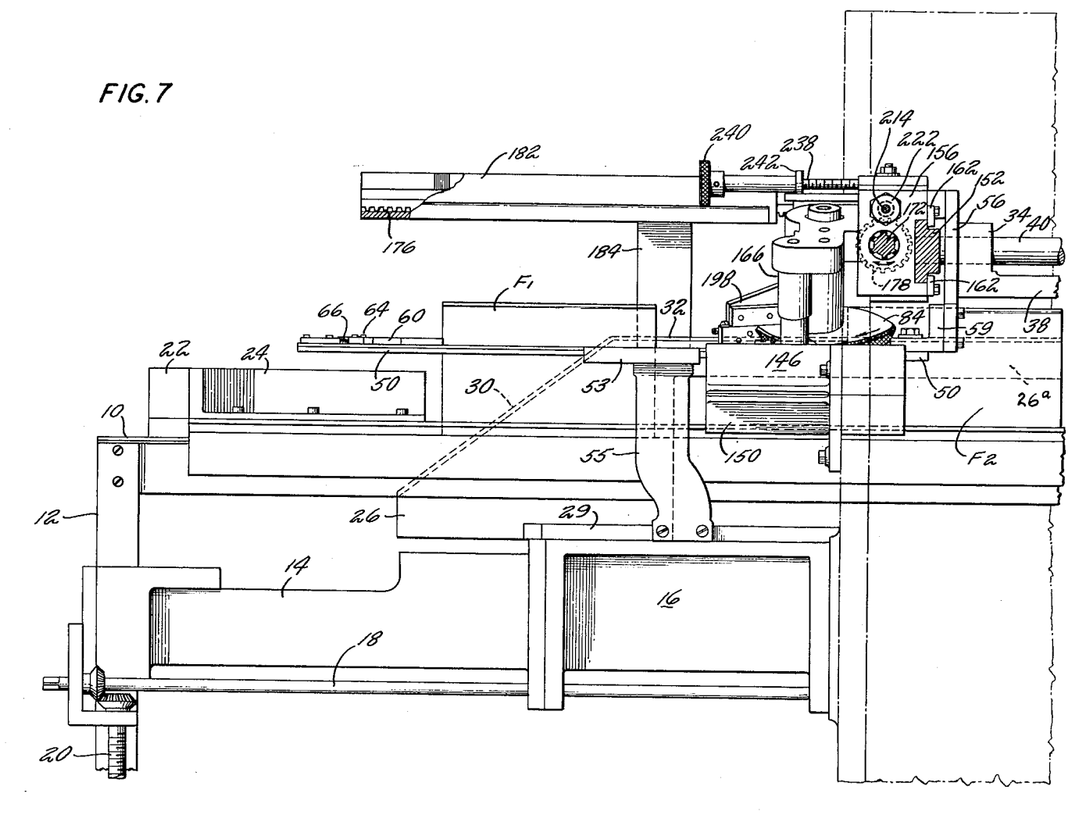
FIG. 7 is an enlarged fragmentary side view similar to a portion of FIG. 1 but showing the parts in greater detail.
Figure 8:
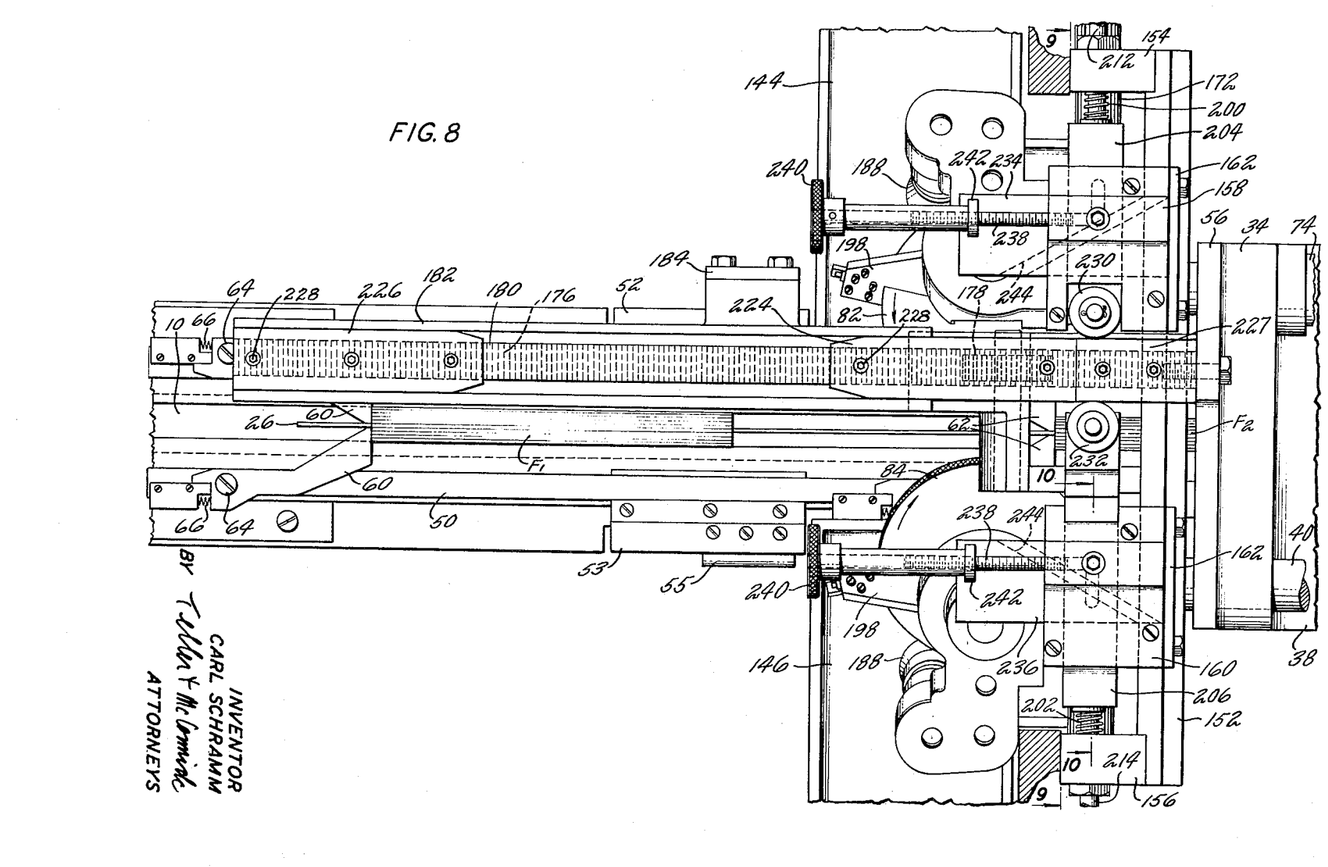
FIG. 8 is an enlarged fragmentary plan view somewhat similar to FIG. 2, this view being partly in section along the line 8—8 of FIG. 1.

Connected with the reciprocatory cross bar 34 of the carrier unit and projecting toward the front, or toward the left as viewed in FIG. 2, are two longitudinally reciprocable feed bars 48 and 50, said bars being supported and guided by stationary members 52 and 53 carried respectively by brackets 54 and 55 extending upwardly from said plates 28 and 29. As best shown in FIGS. 7 and 8, the bar 34 carries a vertical plate 56 and the bars 48 and 50 are connected to said plate by angle members 58 and 59. Carried by the bars 48 and 50 are two or more pairs of pusher fingers engageable with fillers F, F on the support bar 10. As shown, there are two pairs of fingers 60, 60 and 62, 62 which are longitudinally spaced by a distance somewhat greater than the maximum length of the fillers to be fed into the machine. Each finger 60 or 62 is pivotally connected as at 64 with its corresponding bar 48 or 50 for movement into or out of filler engaging position. Each finger is biased by a spring 66 toward its filler engaging position.

The reciprocatory carrier unit also includes a pair of clamp jaws 68 and 70 which are best shown in FIG. 3. The shaft 42 is oscillated by a gear 72 thereon and by other parts that need not be described in detail. A sleeve 74 surrounds the oscillatory shaft 42 and is connected to oscillate therewith. Short pivot rods 76 and 78 extend between the bars 34 and 36 and the clamp jaws 68 and 70 are pivotally supported on said rods. Connected with said clamp jaws are intermeshing gear segments 79 and 80, and a link 81 connected with said oscillatory sleeve 74 serves to oscillate said jaws. The gear 72 and the parts associated therewith oscillate the shaft 42 and the jaws 68, 70 in timed relation with the longitudinal reciprocation of the carrier unit so that the jaws are moved toward each other to engage a filler simultaneously with the start of the movement of the carrier unit toward the right. The jaws are thereafter separated and remain separated during retrograde movement of the carrier unit.

In the operation of the machine, fillers F are successively placed manually or by a suitable mechanism in the left position $F_1$ shown in FIG. 2, the said placing of the fillers being timed in accordance with the reciprocation of the carrier unit and of the fingers 60, 60 and 62, 62. In the said left or first position $F_1$ the filler is supported on the bar 10 and between the guides 22 and 24 with the plate 26 entered between the central pages. As the carrier unit is moved toward the right, the first filler is moved by the fingers 60, 60 to the $F_2$ position, the filler that was at the $F_2$ position is moved by the fingers 62, 62 to the $F_3$ position, and the filler that was at the $F_3$ position is clamped by the jaws 68 and 70 and is moved to the $F_4$ position. When the carrier unit is returned to its initial position, the jaws 68 and 70 release the engaged filler to leave it in the $F_4$ position, and the fingers 60, 60 and 62, 62 move in opposition to the springs 66 so as to move past the fillers at positions $F_2$ and $F_3$.

Figure 6:
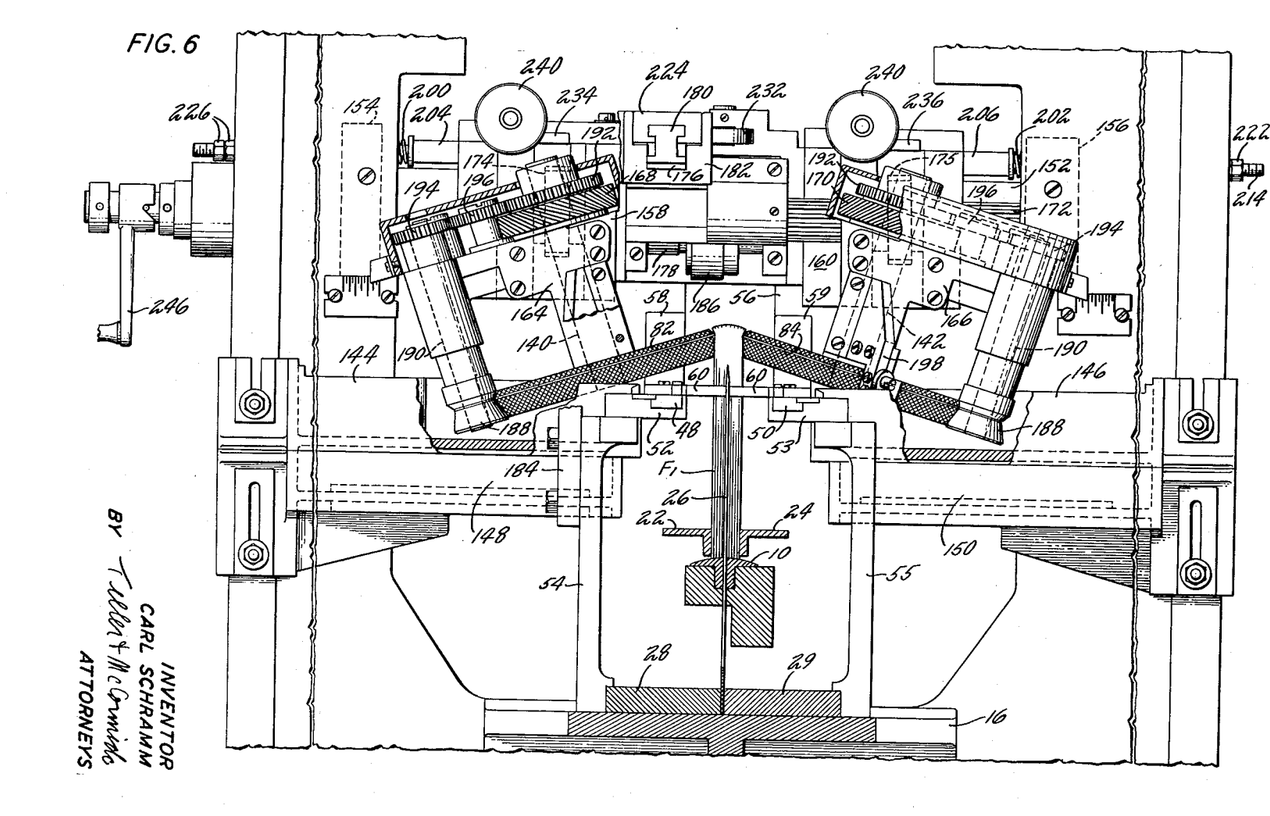
FIG. 6 is an enlarged fragmentary front view of the machine.

As the fillers are fed along the initial horizontal path, they are subjected to the action of an adhesive applying means which serves to apply adhesive to said fillers at opposite sides thereof and at opposite horizontal upper zones near the filler backs. This adhesive applying means may be a part of an adhesive applying attachment as hereinafter explained and said means is shown as comprising two opposed rolls 82 and 84 which are best shown in FIGS. 6 and 8. While the invention is not so limited, the adhesive applied by said rolls 82 and 84 is ordinarily glue. For convenience, the adhesive so applied will be sometimes hereinafter referred to as glue.

As each filler approaches the $F_4$ position it moves off from the guide plate 26 and onto a saddle which comprises two thin closely spaced vertical plates 86, 86. Said saddle plates are supported in their spaced relationship by brackets 88, 88. The mid leaves of each filler have already been separated by the guide plate 26 and beveled guides are provided at the rear end of said plate which additionally separate said leaves so that said filler moves onto the saddle with the saddle plates between said mid leaves as shown in FIG. 4.

After being placed on the saddle in the $F_4$ position by the jaws 68 and 70, each filler is further moved toward the right to the position $F_5$ as indicated by dotted lines. Each filler is so moved by a pusher member 90 shown in FIG. 2, this member being longitudinally reciprocable in the proper timed relationship and being also movable transversely into and out of position for engaging the filler.

Figure 5:
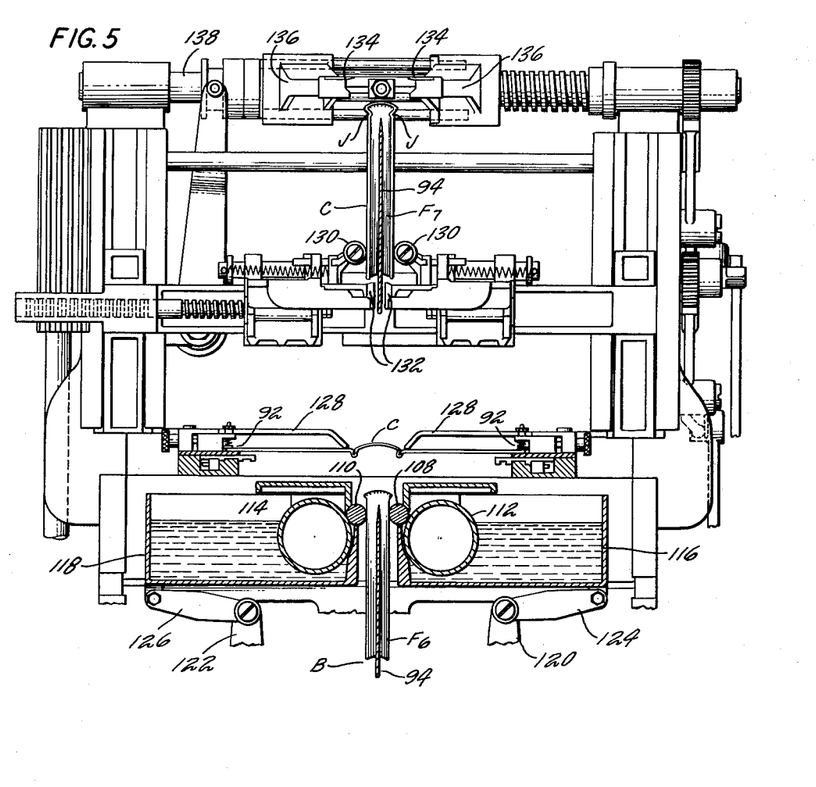
FIG. 5 is an enlarged fragmentary transverse sectional view taken along the line 5—5 of FIG. 1.

During the movement of successive fillers F to the position $F_5$, successive cases C are moved to the position shown in FIG. 5, which position is vertically above said filler position $F_5$. Each case is releasably held in said position by supporting devices indicated generally at 92, 92. The details of the mechanisms for moving cases C to the said position do not constitute a part of the present invention and said mechanism is not described.

For moving the fillers upwardly from the $F_5$ position and into engagement with cases C, there is provided a series of elevator blades 94, 94 that are attached to an endless chain 96 passing around sprocket wheels 98 and 100. Each blade is connected with the chain by means of a block 102 which during its upward movement is guided by a vertical stationary guideway as shown in FIG. 2. The chain is moved intermittently in the direction indicated and as each blade starts its upward movement it enters between the two plates 86, 86 of the saddle so as to engage the corresponding filler and lift it from the saddle. The intermittent movement of the chain 96 is effected by mechanism that includes an oscillating segmental rack 104 meshing with a gear 106 on the shaft for the sprocket wheel 100, said gear being connected with said shaft by a single direction clutch which is not shown. The mechanism is so timed that, the chain and the elevator blades thereon are moved during each cycle through a distance equal to the spacing between blades. The mechanism is further so timed that the lowermost upwardly moving blade engages a filler immediately after the filler reaches the $F_5$ position.

As shown in FIG. 1, the lowermost elevator blade is approaching but has not yet quite reached its filler engaging position, which will be designated as station I. In its next intermittent movement the corresponding elevator blade will fully engage the filler and will move it to position $F_6$ as indicated by dotted lines in FIG. 1 and as more fully shown in the lower portion of FIG. 5. The elevator blade is then at station II.

Referring more particularly to FIG. 5, two rolls 108 and 110 for applying adhesive are positioned below the position of the case C and at opposite sides of the upwardly moving filler, these rolls serving to apply adhesive to the sides of the filler except at said horizontal zones at the top to which adhesive has already been applied by said rolls 82 and 84. While the invention is not so limited, the adhesive applied by said rolls 108 and 110 is ordinarily paste. For convenience, the adhesive so applied will be hereinafter sometimes referred to as paste. Due to the intermittent movement of the chain 96 and of the elevator blades 94, 94, the filler is momentarily held approximately in the $F_6$ position shown in FIG. 5.

The rolls 108 and 110 are supplied with paste by rolls 112 and 114 that are in paste boxes 116 and 118. In accordance with usual practice the rolls 108 and 110 are rotated by suitable mechanisms in such directions and at such speed that the surface speed of the rolls is the same as the speed of upward movement of the book fillers.

Said paste boxes 116 and 118 are horizontally movable in opposite directions and in unison to bring said paste rolls 108 and 110 into and out of engagement with fillers. The paste boxes are so moved by mechanism that includes oppositely movable levers 120 and 122 connected respectively with said boxes by links 124 and 126. The details of the last said mechanism do not constitute a part of the invention, and a full description is unnecessary. It is sufficient to say that said mechanism is timed to bring the rolls 108 and 110 into engagement with each upwardly moving filler when said filler is approximately in the $F_6$ position shown in FIG. 5. The last said position is such that the rolls 108 and 110 engage the fillers at the bottoms of the zones of the adhesive applied by the rolls 82 and 84.

After being engaged with a filler the rolls 108 and 110 are held in engagement therewith until the filler has moved upward beyond them during the next following movement of the elevator blade. Then said rolls 108 and 110 are separated and are held separated until moved inwardly to engage the next following filler. Inasmuch as adhesive has been previously applied to the inwardly curved upper zones of the fillers, there is no necessity for the very accurate timing that would otherwise be necessary to insure adequate pasting of said upper zones by said rolls 108 and 110. The rolls 108 and 110 effect pasting of the entire side areas of the fillers below said upper zones thereof to which adhesive has been applied by the rolls 82 and 84.

As each filler moves upwardly beyond the $F_6$ position, it engages the case C which has been supplied to the position shown. Each case has covers hinged to the back thereof. Continued upward movement of the filler beyond the $F_6$ position withdraws the case C from its supporting devices 92, 92. During said upward movement stationary devices 128, 128 serve to fold said covers of the case downwardly against the sides of the filler to which adhesives have been applied. Thereafter the filler and the case move together as an assembled book.

Upward movement by said elevator blade is continued to the $F_7$ position shown in the upper part of FIG. 5, the elevator blade being then at station III. In moving to the last said position the filler and the case pass between rolls 130, 130 that firmly press the covers of the case against the filler to prevent the book from opening and to insure adherence of said covers to said filler. With the assembled book in the last position, the corresponding elevator blade 94 is momentarily stationary at said station III.

Positioned below the last said $F_7$ position are lifting plates 132, 132 which are movable toward each other and then upwardly to lift the assembled book partly from the stationary elevator blade 94. The plates 132, 132 lift each book far enough for oppositely disposed jaws 134, 134 to move inwardly and engage the books at the joints J, J thereof. The jaws 134, 134 are carried by an arm 136, best shown in FIG. 1, which is pivoted for arcuate movement about a transverse axis at 138. At the proper time the arm 136 is swung upwardly and carries the book with it so as to completely separate said book from the corresponding elevator blade. Swinging movement of the arm 136 is continued until it reaches the position 136' shown by dotted lines. Then the jaws 134, 134 are separated to deposit the book in a receptacle or chute 138. Following the transfer and release of the book the arm 136 and the jaws 134, 134 are returned to their initial positions for engaging and transferring the next following book. In the meantime the elevator blade that was at station III has moved beyond said station and another blade has move to said station carrying another assembled book with it.

The details of the mechanisms and devices supporting and operating the pressing rolls 130, 130 and the lifting plates 132, 132 and the transfer arm 136 with its jaws 134, 134 do not constitute a part of the present invention and these devices and mechanisms are therefore not fully described.

With the exception of the adhesive rolls 82 and 84 and their associated parts which may constitute an attachment and with the further exception of certain details of the feed mechanism, the machine as thus far described is or may be the same as or similar to that disclosed in said Patent No. 1,765,349. Reference is made to said patent for any details not herein fully disclosed. Said rolls 82 and 84 and other parts that are not disclosed in said patent and that may constitute the attachment will now be described in detail.

Said rolls 82 and 84 are at opposite sides of the path of movement of the fillers and they are operable during movement of the fillers along said path. Said rolls are mounted on spindles 140 and 142 and said rolls dip into and pick up adhesive such as glue from boxes 144 and 146. In order that they may dip into the glue, said spindles 140 and 142 are oppositely inclined and their axes diverge upwardly. Said rolls are shaped at their peripheries to conform to the shape of the upper zones of the rounded fillers, thus insuring adequate application of adhesive notwithstanding the inward curvature of said zones. Said adhesive boxes 144 and 146 are rigidly secured to the main frame of the machine and they may be vertically adjustable. The adhesive rolls 82 and 84 are relatively large and the inner portions of the boxes 144 and 146 are wider than the outer portions thereof so as to receive the lower portions of said rolls. This will be evident from FIG. 2 which shows the shapes of the adhesive boxes. Preferably boxes 148 and 150 having approximately the same size and shape as said adhesive boxes are located below the latter and are similarly adjustable vertically. Said boxes 148 and 150 are adapted for holding heated water for maintaining heat in the adhesive in said boxes, this being particularly desirable when the adhesive is glue. The water in said boxes 148 and 150 may be heated in any suitable manner.

A transverse horizontal rail 152 is connectible to the frame of the machine and is preferably connectible to the interior face of the front wall of the machine by means of brackets 154 and 156. When there is a separate adhesive applying attachment, said rail constitutes the support for the major portions of said attachment. The rolls 82 and 84 are carried respectively by heads 158 and 160 which are supported by and are adjustable along said rail 152. The heads are held in place on the rail by retaining strips 162, 162.

The adhesive rolls 82 and 84 are connected with the heads 158 and 160 by brackets 164 and 166 which are similar except for reversal of shape, said brackets being rigidly secured to said heads. The said oppositely inclined spindles 140 and 142 carry helical gears 168 and 170 near their upper ends. A rotatable shaft 172 extends transversely through the heads 158 and 160 and has bearings in the brackets 164 and 166. Said shaft 172 is splined throughout its length and helical gears 174 and 175 within the heads 158 and 160 have suitable engagement with the shaft 172 for rotation therewith. The gears 174 and 175 are positioned and adapted to mesh respectively with the helical gears 168 and 170 and the adhesive rolls 82 and 84 are thus rotated when the shaft 172 is rotated. The gears 168 and 174 constitute one set of gearing and the gears 170 and 175 constitute another set of gearing, said sets of gearing serving respectively to rotate the two adhesive rolls 82 and 84.

Figure 9:
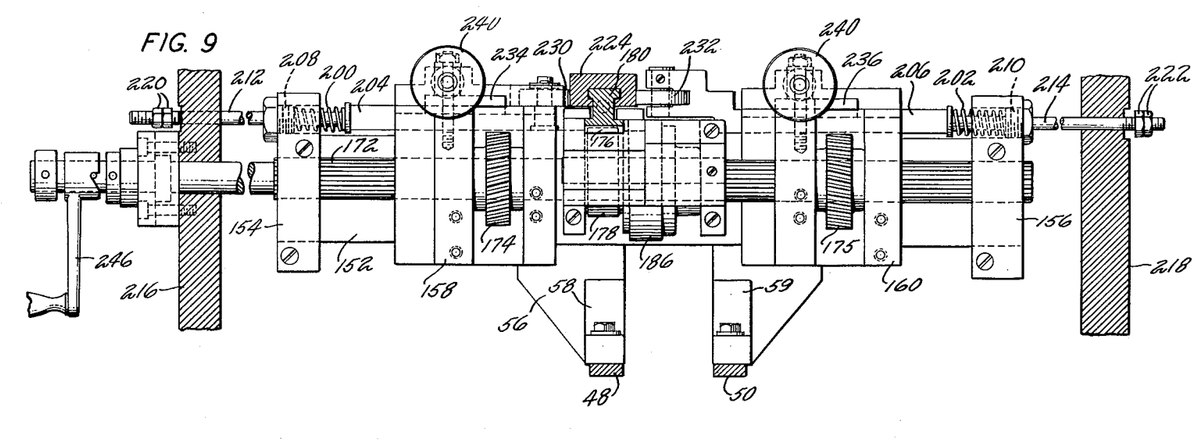
FIG. 9 is a view of portions of the auxiliary adhesive applying mechanism separated from other parts, this view omitting the adhesive wheels and the immediately associated parts and being taken in the direction of the arrows 9, 9 in FIG. 8.

For rotating the shaft 172 there is provided a longitudinal rack 176 which meshes with a gear 178 on said shaft, as best shown in FIG. 9. The rack 176 is at the bottom of a bar 180 which has another function as hereinafter described. The bar 180 is longitudinally movable and is connectible with the cross bar 34 of the before-described carrier unit for movement in unison therewith. Preferably the bar 180 is supported and guided by a longitudinal channel member 182 which is shown as being supported by an upright bracket 184 connected with the bracket 54. When the carrier unit moves toward the right or toward the rear for feeding a filler, the rack 176 causes the gear 178 to rotate in the clockwise direction as viewed in FIG. 7. The angles of the helical gears 174, 175 and 168, 170 are such that the adhesive rolls are turned oppositely and in the directions indicated in FIG. 8. The result is that the peripheries of the rolls move in the same direction as the direction of filler feeding and the gear ratios are such that the peripheral speed of the rolls is the same as the speed of feeding. The speed of feeding varies from zero to maximum to zero and the peripheral speed of the rolls varies in exactly the same manner.

Preferably the gear 178 is not splined to said shaft 172 but is rotatable relatively thereto. Said gear is connected with said shaft by a unidirectional clutch 186 which is best shown in FIG. 9. The driving element of said clutch is connected with said gear 178 and the driven element of said clutch is connected with said shaft 172. The clutch 186 is so constructed that the shaft 172 and the glue rolls 82 and 84 are driven as described during the feeding movement of the filler feeding mechanism but are idle during the return movement of said feeding mechanism.

Preferably an auxiliary or doctor roll 188 is associated with each of the main adhesive rolls 82 and 84, said doctor roll 188 being secured to a spindle 190 rotatable in the corresponding bracket 164 or 166 and parrallel with the corresponding spindle. The rolls 188, 188 are shaped and positioned to fit the rolls 82 and 84. The rolls 188 are driven by gears 192, 192 on the spindles 140, 142, by gears 194, 194 on the spindles 190, 190 and by interposed idler gears 196, 196. It will be seen that the doctor rolls 188, 188 are rotated when the rolls 82, 84 are rotated and in the same directions, but the gearing ratios are preferably such that the rolls 188, 188 have a considerably greater peripheral speed. The rolls 188, 188 rotate in the same directions as the rolls 82, 84, but their engaging peripheral edges move oppositely. Said rolls 188, 188 dip more deeply into the adhesive, such as glue, in the boxes 144, 146 and by reason of their greater peripheral speed they deposit ample quantities of glue on the peripheral faces of the main rolls.

Primarily by reason of the doctor rolls 188, 188 the main rolls ordinarily carry more adhesive than is necessary or desirable for applying to the book fillers. Scrapers 198, 198 are therefore provided on the brackets 164 and 166 for eliminating excess glue from the rolls 82 and 84 so that said rolls carry adhesive layers of uniform thickness when they come into contact with the book fillers.

It is ordinarily preferred to avoid the application of adhesive to the extreme front and rear edge portions of the fillers, as adhesive so applied might overflow onto the ends of the fillers where it would be very objectionable. The heads 158 and 160 are freely movable along the rail 152, the gears 174, 175 being similarly movable along the splined shaft 172. The heads are biased for inward movements by springs 200 and 202 which abut at their inner ends against members 204 and 206 on said heads and which abut at their outer ends against plugs 208 and 210 on the brackets 150 and 152. Preferably the springs surround rods 212 and 214 which are connected with said members 204 and 206 and which extend transversely through holes in the sides 216 and 218 of the main frame of the machine. The rods 212 and 214 carry nuts 220 and 222 which serve as stops to limit inward movement of the heads and glue rolls by said springs 200, 202.

Means is provided for oppositely adjusting said heads 158 and 160 and said rolls 82 and 84 in synchronism with the feeding of each filler F. The unidirectional clutch 186 causes the rolls to be idle during the interval between the feeding of one filler and the feeding of the next following filler.

For controlling transverse movements of the heads and adhesive rolls, cams 224 and 226 are provided, these preferably being the longitudinal bar 180 as best shown in FIG. 8. The upper portion of the bar 180 has a T-shape and each cam 224 and 226 has a corresponding shape, this being best shown in FIG. 9. Preferably a spacer 227 is provided at the rear end of the cam 224. The heads 158 and 160 carry rollers 230 and 232 which constitute cam followers for engaging said cams. When the rollers 230 and 232 are in engagement with one or the other of the cams 224 and 226, the heads are held spaced apart to such an extent that the adhesive rolls cannot engage the fillers. The spacer 227 engages the rollers when the cam 224 is in its foremost position. However, when the rollers are disengaged by the cams the springs 200 and 202 move the heads and the glue rollers toward each other so that the latter engage the fillers. This movement is ordinarily limited by a filler, but the nuts 220 and 222 serve as stops to limit the movement when no filler is in place.

As shown in FIG. 8, the cam 224 is so positioned on the bar 180 that it will permit the adhesive rolls to engage the filler $F_1$ when the leading edge of said filler has passed slightly beyond the transverse plane through the axes of the rollers. The cam 226 is so positioned on the bar 180 that it will withdraw the glue rollers out of engagement with the filler $F_1$ slightly before the trailing edge of said filler reaches said plane through the axes of the rolls. During retrograde movement of the bar 180 and of the cam, said cams cause inward and outward movements of the heads and glue rolls, but the rolls are not rotating and said movements have no significance.

The cams 224 and 226 are preferably longitudinally adjustable and when mounted on said bar 180 they are adjustable along the bar and can be locked in place by means such as set screws 228. When the cams are so adjustable spacers 227 of different length may be provided if necessary. By adjusting the cams provision can be made for book fillers of different lengths.

FIG. 8 shows the fillers in the positions that they occupy during retrograde movement of the feed fingers 60, 60 and 62, 62 and other parts of the feed mechanism. It will be evident that the adhesive rolls are so located that they are out of engagement with any filler and are idle during said retrograde movement.

Provision is made for transversely adjusting the heads and glue rolls in accordance with the thickness of the fillers to be handled. In order to permit such adjustment, the before-mentioned members 204 and 206 are transversely adjustable relatively to the heads 158 and 160 and the rollers are carried directly by said members. Devices are provided for adjusting the heads and the glue rollers relatively to said members 204, 206 and said rollers 230, 232.

Figure 10:
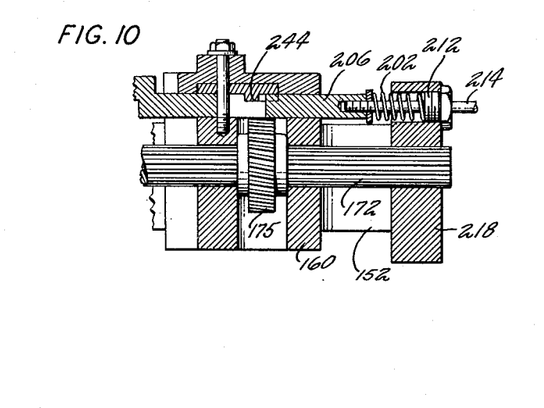
FIG. 10 is a fragmentary transverse sectional view taken along the line 10—10 of FIG. 8.

The last said adjusting devices are shown as comprising slides 234 and 236 which are guided in said heads and are directly above the members 204 and 206, said slides being longitudinally adjustable relatively to said heads. They are so adjusted by means of screws 238, 238 fixedly secured to the heads and by knobs 240, 240 having shanks in threaded engagement with said screws. The shanks have flanges 242, 242 entered in grooves in said slides 234 and 236, and rotation of said knobs moves said slides forwardly or rearwardly. As shown in FIGS. 8 and 10, the slides 234 and 236 have inclined keys 244, 244 on their lower faces which fit corresponding keyways in the upper faces of the members 204 and 206. Longitudinal movement of the slides 234, 236 causes transverse movement of said heads and glue rolls relatively to said members 204 and 206.

Preferably the shaft 172 is extended at one side and carries an optionally useable crank 246 as shown in FIG. 9. The clutch 186 permits the shaft 172 to be turned in its normal direction by the crank, but said shaft cannot be turned reversely. The crank is useful for set-up purposes and more particularly for inspecting the glue rolls to determine that they are applying the proper amounts of glue.

The invention claimed is:

1. In a book casing-in machine, the combination of a rearwardly and forwardly reciprocatory carrier unit, a plurality of longitudinally spaced means connected with said carrier unit for engaging a plurality of longitudinally spaced fillers with their backs upward, said filler engaging means serving to intermittently feed said fillers rearwardly during rearward movements of the carrier unit and said means moving past said fillers during opposite forward movements of the carrier, two transversely adjustable heads, two opposite adhesive rolls carried respectively by said heads and engageable with fillers during rearward feeding movements thereof and adapted to apply adhesive to said fillers at opposite horizontal upper zones near said backs, a transverse rotatable splined shaft, a gear on said shaft having a driving connection therewith, a longitudinal rack movable rearwardly and forwardly with said carrier unit and meshing with said gear to rotate it and to thereby rotate said shaft, two sets of gearing carried respectively by said heads and having splined connection with said shaft to permit transverse adjustment, the said sets of gearing respectively connecting said shaft with said adhesive rolls for rotating the latter during rearward movements of the carrier unit and during rearward feeding of said fillers, and means for oppositely adjusting said heads and said rolls in synchronism with the feeding of each filler which last said means includes cams which are longitudinally movable with said carrier unit and said rack and further includes cam followers on said heads for engaging said cams and for causing simultaneous outward and inward movements of said heads and rolls during longitudinal movements of said carrier unit and rack so as to limit the lengths of the zones of adhesive applied by said rolls in order that the ends of said zones may be spaced from the ends of the filler.

2. A book casing-in machine as set forth in claim 1, wherein the cams are longitudinally adjustable relatively to the carrier unit and in conformity with the length of fillers being fed by the filler feeding means.

3. A book casing-in machine as set forth in claim 1, wherein means are provided for biasing said heads for inward movements, and wherein means additional to said cams are provided for limiting inward movements of said heads and rolls when said cams are moved longitudinally out of engagement with said cam followers.

4. A book casing-in machine as set forth in claim 1, wherein means are provided for transversely adjusting said heads and rolls relatively to said cam followers.

5. An adhesive applying attachment for a book casing-in machine having longitudinally reciprocable means including a carrier unit for intermittently and rearwardly feeding along a horizontal path a succession of book fillers with their backs upward, said attachment comprising a transverse horizontal rail fixedly connectible to the frame of the machine, two heads transversely adjustable along said rail, means supported on said rail and serving when said rail is in place for applying adhesive to fillers movable along said path, said means comprising two opposite rolls which are rotatable about oppositely inclined axes in a transverse plane and which are engageable with said fillers at opposite horizontal upper zones thereof near said backs, two opposite adhesive rolls carried respectively by said heads and engageable with fillers during rearward feeding movements thereof and adapted to apply adhesive to said fillers at opposite horizontal upper zones near said backs, a transverse rotatable splined shaft, a gear on said shaft having a driving connection therewith, a longitudinal rack connectible with said carrier unit for rearward and forward movement therewith which rack meshes with said gear to rotate it and to thereby rotate said shaft, two sets of gearing carried respectively by said heads and having splined connection with said shaft to permit transverse adjustment, the said sets of gearing respectively connecting said shaft with said adhesive rolls for rotating the latter during rearward movements of the carrier unit and during rearward feeding of said fillers, cams longitudinally movable with said rack, and cam followers on said heads for engaging said cams and for causing simultaneous outward and inward movements of said heads and rolls during longitudinal movements of said carrier unit and rack so as to limit the lengths of the zones of adhesive applied by said rolls in order that the ends of said zones may be spaced from the ends of the filler.

6. An adhesive applying attachment as set forth in claim 5, wherein the cams are longitudinally adjustable relatively to the carrier unit and in conformity with the length of fillers being fed by the filler feeding means.

7. An adhesive applying attachment as set forth in claim 5, wherein means are provided for biasing said heads for inward movements, and wherein means additional to said cams are provided for limiting inward movements of said heads and rolls when said cams are moved longitudinally out of engagement with said cam followers.

8. An adhesive applying attachment as set forth in claim 5, wherein means are provided for transversely adjusting said heads and rolls relatively to said cam followers.

References Cited in the file of this patent

UNITED STATES PATENTS

| | | |
|---|---|---|
| 988,651 | Norton | Apr. 4, 1911 |
| 1,765,349 | Schramm et al. | June 17, 1930 |
| 2,640,208 | De Florez et al. | June 2, 1953 |